(12) United States Patent
Muller et al.

(10) Patent No.: US 11,256,005 B1
(45) Date of Patent: Feb. 22, 2022

(54) NEAR-EYE FOVEAL DISPLAY

(71) Applicant: SoliDDD Corp., Brooklyn, NY (US)

(72) Inventors: Richard A. Muller, Berkeley, CA (US); Neal Weinstock, Brooklyn, NC (US)

(73) Assignee: Soliddd Corp., Brooklyn, NY (US)

( * ) Notice: Subject to any disclaimer, the term of this patent is extended or adjusted under 35 U.S.C. 154(b) by 259 days.

(21) Appl. No.: 16/436,343

(22) Filed: Jun. 10, 2019

Related U.S. Application Data

(63) Continuation-in-part of application No. 15/671,694, filed on Aug. 8, 2017, now Pat. No. 1,058,214, which is a continuation-in-part of application No. 15/594,029, filed on May 12, 2017, now abandoned.

(51) Int. Cl.
*G02B 3/00* (2006.01)
*G06F 1/16* (2006.01)

(52) U.S. Cl.
CPC .... *G02B 3/0006* (2013.01); *G02B 2003/0093* (2013.01); *G06F 1/163* (2013.01)

(58) Field of Classification Search
CPC .............. G02B 27/0172; G02B 27/017; G02B 27/2214; G02B 27/0955; G02B 27/0961; G02B 27/0093; G02B 2027/017; G02B 3/0056

See application file for complete search history.

(56) References Cited

U.S. PATENT DOCUMENTS

| 5,883,606 A | 3/1999 | Smoot |
| 2017/0115432 A1* | 4/2017 | Schmidtlin ........ G02B 27/0176 |

FOREIGN PATENT DOCUMENTS

JP    2006020063 A    1/2006

OTHER PUBLICATIONS

Lv et al., "Fabrication and performances analysis of ball lenses," Advances in Optoelectronics and Micro/nano-optics, 2010, pp. 1-4, doi: 10.1109/AOM.2010.5713556.

* cited by examiner

*Primary Examiner* — Robert E. Tallman
(74) *Attorney, Agent, or Firm* — Ference & Associates LLC

(57) ABSTRACT

An apparatus and system for a display screen for use in near-eye display devices. Small light emitting devices are placed behind a plurality of light-directing beads. The light emitting devices and light-directing beads for a display device and system placed in front of a user for near-eye display. This allows a user to experience near-eye display with greater resolution, wider field of view and faster frame rate. Other embodiments are described herein.

15 Claims, 5 Drawing Sheets

NEAR-EYE FOVEAL DISPLAY

CROSS-REFERENCE TO RELATED APPLICATIONS

This application is a continuation-in-part of U.S. application Ser. No. 15/671,694, filed Aug. 8, 2017, the contents of which are incorporated by reference herein.

FIELD OF THE INVENTION

The present invention relates generally to display systems, and, more particularly, to display systems for near-eye displays such as virtual reality and augmented reality.

BACKGROUND OF THE INVENTION

Recently, there has been significant growth in the use and advancement of virtual reality, augmented reality, and similar near-eye products. Common virtual reality uses include video gaming, movies, amusement ride simulators, and the like. While the popularity is driven by entertainment, the products also serve functions in training and education. For example, virtual reality headsets may be used for flight simulation training, surgery simulation for physicians, technology in the traditional classroom to spark student interest in a subject, and the like.

One method of producing a virtual reality simulation is the use of a headset. The headset contains a display with lenses placed between the eyes and display. The lenses serve to focus and reshape the image perceived by the eyes. In this manner, a 3-dimensional image is formed from 2-dimensional images from the display screen.

However, these virtual reality headsets are large in size and heavy in weight. The requirement of having a display screen a fixed distance from a user's eyes with a lens between the display and eyes requires a certain distance. Additionally, the optical components, as well as computational machinery and electronics, are bulky and heavy. Also, many conventional virtual reality headsets require another device, such as the user's smartphone, to be placed in the apparatus. Many headsets do not include a display device dedicated to the apparatus.

Even more limiting, conventional near-eye displays involve a three-way tradeoff between field of view, image resolution, and frame rate; as each of these three beneficial features may be expanded, it comes at the expense of the others in terms of optical design and computational power. Therefore, systems typically compromise all three and end up with frame rate that is so slow that images lag, resolution so low that the display has a "screen door effect" (i.e. individual pixels can be seen rather than a smooth "retinal display"), and field of view that is very limited.

What is needed is a way for high resolution displays with a wide field of view and fast frame rate to be integrated into near-eye viewing systems, such as a virtual reality headset, to improve the viewing experience. Such a device is referred to herein as a foveal display for reference only; it is capable of aiming images precisely at desired areas of the retina, of which the fovea is the most central area but not the only area addressable by the device.

SUMMARY OF THE INVENTION

In accordance with the present invention, a method and system uses a plurality of light-emitting devices behind a plurality of light-directing beads or lenslets in relation to a user's eye. The device replaces the typical optics in a bulky and cumbersome virtual reality (VR) headset. The device allows for high resolution display in a lightweight package that gives the user a wide-angle view and rapid frame rate.

The device may be a flat panel or curved panel display. Each of the light-directing lenslets or beads is associated with at least one pixel-generating device. For ease of readability, the terms lens or lenses or lenslets will be used here throughout. However, it should be understood that lens, lenses, lenslets, microlenses, and/or beads refer to the same structure within the device. The light-directing lenses may be of a shape that allows the lens to properly direct light from the light-emitting device to the user's retina. The lenses may be in an interlocking configuration or spaced apart with gaps there between.

Focusing the light with this system directly onto the retina of a user's eye allows a user to focus on an image without the need of corrective lenses. A clear focus on an image may be seen at any distance away without the need of correcting a user's sight that may commonly need corrective lenses, in a similar manner to what happens when a user looks through an array of pinholes, or a pinhole camera is used to capture an image; the pinhole effect creates infinite depth of field at a focal distance of infinity. A plurality of lenses may be used to construct a lens array which focuses on infinity typically at a lens' back surface (although it may also be at a particularly determined distance from the lens array), where the display is located. The back surface of a lens would typically be where an image is produced with respect to the user's eye. The present device offers advantages to the use of traditional near-eye displays due to lightweight construction, high resolution, fast frame rate, extremely wide field of view, and no need for multiple lenses at successive distances from the display in an optical stack (which, in turn, entail lower resolution, narrower field of view, greater size and weight, strong potential for misalignment, and other drawbacks). In a flat panel display, the present device offers advantages in showing an extremely wide field of view, which is coextensive with a single viewing zone, for accurate autostereo 3-dimensional (3D) display of volumetric information.

In summary, one aspect provides a device, comprising: a plurality of light-directing beads, wherein the beads are arranged in a pattern having a first dimension and a second dimension, wherein the first dimension comprises a horizontal dimension and wherein the second dimension comprises a vertical dimension; and a display comprising a plurality of pixels, wherein the display is arranged behind the plurality of light-directing beads in relation to a human eye; wherein each of the plurality of light-directing beads is associated with at least one of the plurality of pixels.

Another aspect provides a system, comprising: at least one processor; a power source operatively coupled to the processor; a plurality of light-directing beads, wherein the beads are arranged in a pattern having a first dimension and a second dimension, wherein the first dimension comprises a horizontal dimension and wherein the second dimension comprises a vertical dimension; and a display operatively coupled to the at least one processor and the power source and comprising a plurality of pixels, wherein the display is arranged behind the plurality of light-directing beads in relation to a human eye; wherein each of the plurality of light-directing beads is associated with at least one of the plurality of pixels; and wherein the plurality of light-directing beads direct light produced by the display to a user's eye to generate a perceived image.

The lens array is of the general category of an integral imaging, plenoptic system, as is commonly known to those well versed in the art. As such, each lens in the array provides a complete image which might be viewed alone as a comprehensible image; each such image presented by the lens array is a portion of the overall image seen by the viewer, herewith to be called the reference image. Each lens in the foveal display provides a high quality portion of the reference image through an individual lens. The given portion of the reference image presented by each lens is a product of a calculation dependent on the location of a lens in the array and other factors, including the focal length of the lens and the viewer's general position relative to the display; the portion of the reference image shown by each lens may be greater or smaller, and with more or less overlap, based on algorithms which reflect various developer and user preferences. In an embodiment, rather than a developer having calculated a fixed portion of the reference image always shown by each lens in the array, the system may utilize gaze tracking to determine which lenses (and the areas of the display behind them) in the array are seen at a given moment by the viewer(s), in order to most efficiently show the highest quality portion of an image. In a similar embodiment, gaze tracking may be used to locate degenerated areas of the viewer's retina. The foveal display may then be used to aim images precisely at areas of the retina where vision is better. In either embodiment, among others, parallel rays of light entering into the retina of a user provide that user with an overall view of the entire reference image that is focus-free, seen at infinity, and with very great depth of field. In other words, users who normally require some vision correction for myopia, presbyopia, accommodation or astigmatism do not need to wear their eyeglasses or contact lenses to see the image in full focus.

A BRIEF DESCRIPTION OF THE DRAWINGS

DETAILED DESCRIPTION OF THE INVENTION

Figure 1:
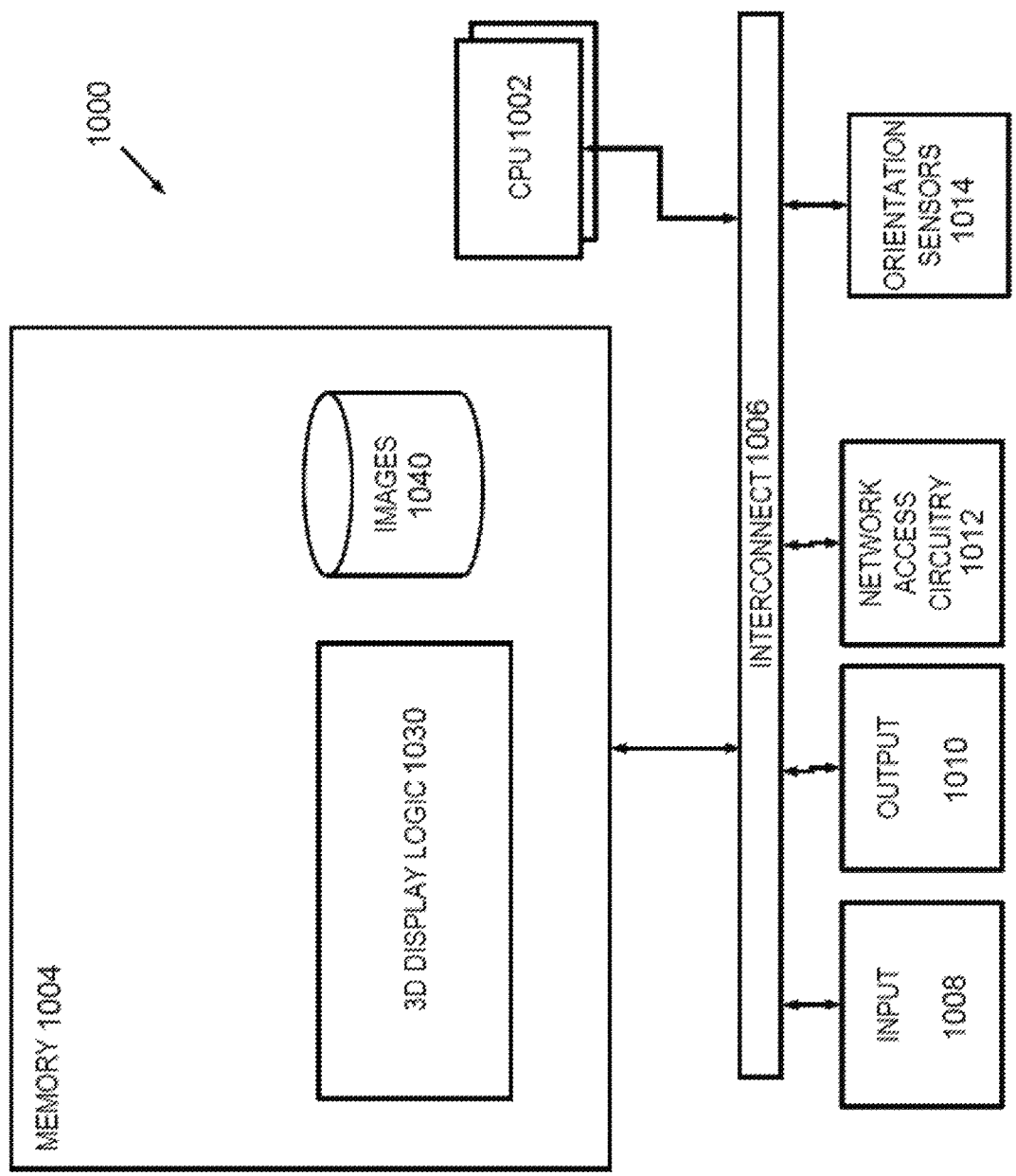
FIG. 1 is a block diagram showing an example apparatus device.

In accordance with the present invention, an embodiment provides a method and system of providing a high-resolution near-eye display that is simultaneously capable of fast frame rates and very wide field of view. The system provides for a near-eye display without the large and cumbersome optical stack and other drawbacks found in conventional virtual reality headsets. The apparatus comprises a plurality of light-directing beads or mini-lenses. Reference in this application to the light-directing lenses may also be called light-directing beads or beads, or microlenses, or lenslets, for brevity and ease of reading. The beads shape may include fish-eye, spherical, ovoid, hexagonal, square, columnar, triangular, or like 3-dimensional shapes or like cross dimensional shapes. The term bead should not be construed as referring only to a spherical structure, although spherical beads may be an embodiment. Bead shapes in figures are illustrative only of an embodiment. Each of the disclosed bead shapes may have a different refractive index in different embodiments. The lenses are arranged in a pattern having a first dimension and a second dimension. The first dimension may include a horizontal dimension and the second dimension may include a vertical dimension, for example, as in a matrix or grid-like pattern. Alternatively, the pattern having the first dimension and a second dimension may not be in a grid-like pattern but may instead include a different pattern structure, for example, a brick-like pattern structure, an alternating pattern structure, or the like.

The apparatus may also include a display comprising a plurality of pixels, for example, a plurality of light emitting devices, a printed image of sufficiently high resolution, or the like. The display may be arranged behind the plurality of light-directing lenses in relation to a human eye. For example, from the perspective of the eye, the light-directing lenses may be closest to the eye and the display may be behind the light-directing lenses. Each of the plurality of light-directing lenses may be associated with at least one light-emitting device or pixel of the printed image of sufficiently high resolution. In other words, for each light-directing lens, the device may have a corresponding light-emitting device or static printed image.

The device comprises a matrix of lenses around or in front of the eye enabling a user to focus on pixels from a light-emitting device, or a reflective or translucent and backlit image, and associated pixels behind the lenses in relation to the user's eye. The lenses may be of a glass or plastic material, with the combination of a focal length and preferred index of refraction such that the lenses focus on the image plane at infinity, as seen by the user's eye. In an embodiment, the lenses or beads may use specialized materials to achieve the above goal with an unusual high index of refraction significantly above the normal range of about 1.5 when using glass, plastic, or the like, and may include specialized additives, such as are commonly used in retroreflective beads, or by placing the lens array around, or in front and/or back of a material with high refractive index such as a cholesteric liquid crystal cell. As should be understood by one skilled in the art, these examples of materials with high refractive indices are merely examples and are not meant to be limiting as other materials or combination of materials to achieve a high refractive index are possible and contemplated.

Referring to FIG. 1, a device 1000, for example, that which is used for the viewing apparatus, is described. The device 1000 includes one or more microprocessors 1002 (collectively referred to as CPU 1002) that retrieve data and/or instructions from memory 1004 and execute retrieved instructions in a conventional manner. Memory 1004 can include any tangible computer readable media, e.g., persistent memory such as magnetic and/or optical disks, ROM, and PROM and volatile memory such as RAM.

CPU 1002 and memory 1004 are connected to one another through a conventional interconnect 1006, which is a bus in this illustrative embodiment and which connects CPU 1002 and memory 1004 to one or more input devices 1008 and/or output devices 1010, network access circuitry 1012, and orientation sensors 1014. Input devices 1008 can include, for example, a keyboard, a keypad, a touch-sensitive screen, a mouse, and a microphone. An embodiment may include an input device such as a camera or photo-sensor used for eye-tracking. Eye tracking that is then associated with computer-activation of particularly chosen pixels is a typical implementation of the invention when used in a near-eye display and other embodiments. Output devices 1010 can include a display—such as an OLED (organic light-emitting diode), a microLED, or liquid crystal display (LCD), or a printed image of sufficiently high resolution—and one or more loudspeakers. Network access circuitry 1012 sends and receives data through computer networks. Orientation sensors 1014 measure orientation of the device 1000 in three dimensions and report measured orientation through interconnect 1006 to CPU 1002. These orientation sensors may include, for example, an accelerometer, gyroscope, and the like, and may be used in identifying the position of the user.

Information handling device circuitry, as for example outlined in FIG. 1, may be used in devices such as virtual reality, augmented reality, tablets, smart phones, personal computer devices generally, and/or electronic devices which may provide near-eye displays screens to a user.

Figure 2:
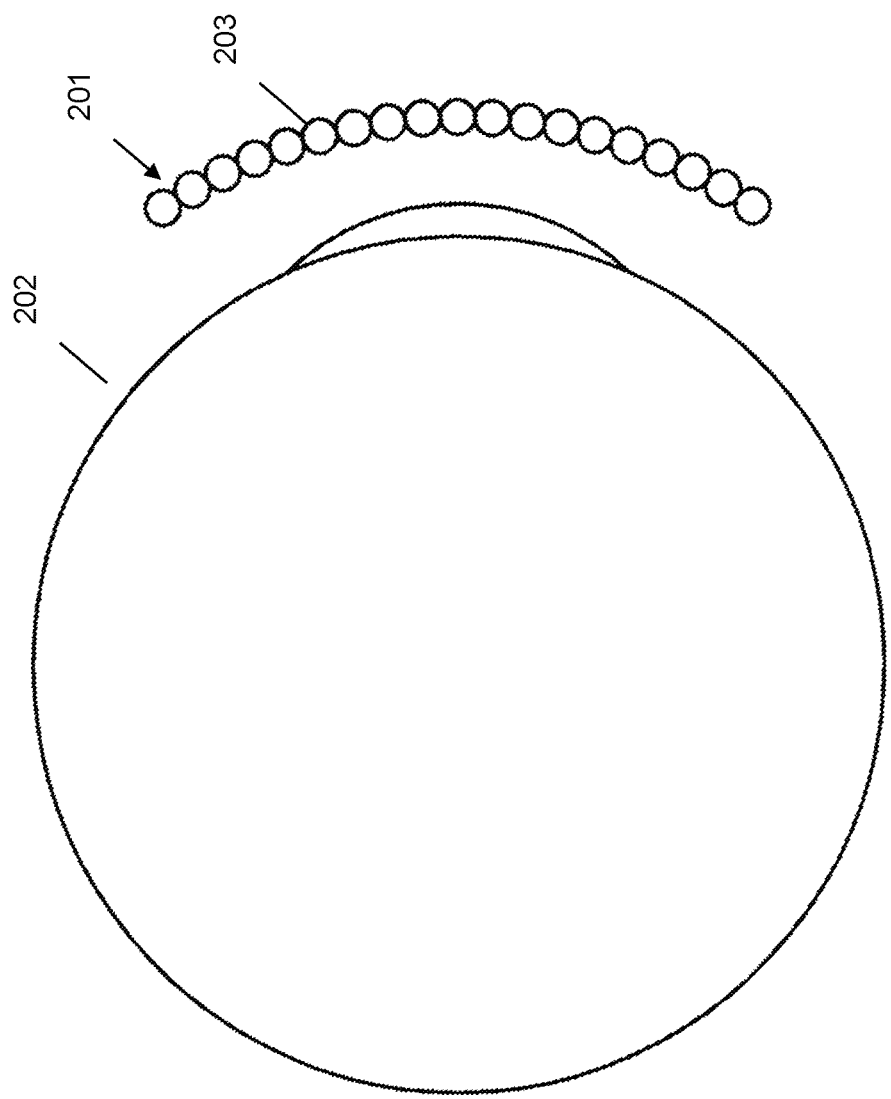
FIG. 2 is a structural diagram showing a side view of the layers of a near-eye display in an embodiment.

Referring now to FIG. 2, an embodiment of a foveal display 201 is shown in a side view. In an embodiment the overall device may be spherical in shape, that is, the overall construction of matrixed spherical beads would be shaped into a portion of a sphere surrounding the eye 202. An embodiment comprises a plurality of light-directing beads or lenses 203 that are arranged in a pattern having a first dimension and a second dimension. The first dimension may include a horizontal dimension and the second dimension may include a vertical dimension. As discussed above, the pattern may include a matrix pattern, grid pattern, brick-like pattern, alternating pattern, pattern having spaces between the beads, or the like. For example, the light-directing beads may include small spheres or beads. In one example, the beads may have a diameter of 3.6 millimeters or 3600 microns. This is approximately the largest diameter that may be used in a near-eye embodiment of the device, as a key parameter is to maintain a parallel ray presented to the eye, which necessitates a diameter smaller than the human pupil, In such an example, the pixel separation required in order to achieve resolution beyond the eye's ability to see any differentiation between one pixel and the next is 3600/3600 or 1 micron. The actual resolution required in order to achieve what most adults will perceive as an image with resolution beyond their eyes' resolving power is, however, several times less, as the pinhole effect created by a lens diameter smaller than the pupil—similar to when a viewer squints—increases depth of field and brings the image into better apparent focus.

An embodiment may include a display comprising a plurality of light-emitting devices. The light-emitting devices may include a display, for example, as in a television or other picture producing display. Each light-emitting device may correspond to a single pixel or group of pixels of a display. For example, as in a television, each pixel is generated using a light-emitting device. The display is arranged behind the plurality of light-directing lenses in relation to a human eye. An embodiment may include at least one light-emitting device corresponding to each of the plurality of lenses. For example, the device may include the same number of light-emitting devices as the number of lenses. (This, however, would result in a very low resolution image.) Each light-emitting device may have a corresponding lens in which the light of the light-emitting device may be directed. The light-emitting device may be a light-emitting diode (LED), micro LED, organic light-emitting diode (OLED), active-matrix organic light-emitting diode (AMOLED), or the like. The light-emitting devices may be as small in size as 30,000/inch or about 0.8 microns in size at the smallest possible requirement in a near-eye display embodiment in order to maintain resolution beyond that of the human eye's resolving power; as mentioned above, however, the pinhole effect significantly eases the resolution requirement for the display in order to maintain this same effective perfect resolution, and the specific design of the lenslets in the array can also lessen this resolution requirement as will be seen.

In an embodiment, the pixels comprising a portion of a display, or comprising a portion of a printed image attached to a lens, are produced in such a way that an overlapping of images is present. Throughout a system each lens in the array may present a view of a display, or an image, that when pieced together with other views associated with other portions of a display, produces a clear, in-focus display of the overall image to a user.

In one embodiment, rather than a light-emitting device, the system may include a printed image of sufficiently high resolution affixed to the back side of the lenses as viewed by a user's eye. Each pixel or a group of pixels of the image may correspond to a lens. For example, each lens may "display" a pixel or group of pixels of the overall image. In other words, as a user is looking through the lens, the user will see the corresponding pixel or group of pixels through a single lens. This group of pixels presents an integral image, i.e. one that is viewable as a discreet whole without the complement of any other images or image portions shown through other lenses in the array. Each of the plurality of lenses presents an integral image that is slightly offset from the others in series, with each image coordinated such that a single, overall image is presented to the eye. Thus, as the user is looking through the plurality of lenses, the user can see the overall image. For ease of readability, the term light-emitting device will be used throughout. However, the use of a printed image is possible and is not intended to be excluded from the discussion herein.

The plurality of light-directing lenses properly direct light from light-emitting devices or direct the pixels of the image to the user's eye. In other words, as the user is looking through the lenses, the lenses may direct the light or images in a manner which provides the user with a view of single overall image. The light-directing lenses may be of any shape, for example, essentially spherical shape (albeit in many implementations with sides and rear section shaved off to fit more closely together or fit better to the underlying display while still maintaining a spherical front surface for the critical section of the lens that must focus on the appropriately viewed pixels) that allows the light from the light-emitting device or printed image of sufficiently high resolution to be properly directed to the user's eye. Reference in this application to the light-directing lenses may also be called beads for brevity and ease of reading. The bead's shape may include fish-eye, spherical, ovoid, hexagonal, square, columnar, triangular, or like 3-dimensional shapes or like cross dimensional shapes. A display may comprise a mix of different bead shapes. Different beads shapes may be arranged either in groups of like beads or interspersed with different bead shapes mixed together. Beads may be arranged such that the beads interlock, or may have gaps formed by edges of adjacent beads.

Properly directing the light into the user's eye, specifically at the retina of a user's eye, may permit a user to view an image in a system without the use of corrective lenses. By directing the light onto a user's retina while passing through the natural focusing lens of the pupil, an image can be seen, without the need of prescription glasses, from any distance. The small diameter of each lens in the array required to do this also allows each lens to create a pinhole effect, so that the image is presented at infinity; the combined effect permits a user to focus on an image regardless of their need of corrective lenses. As discussed above, there is a natural maximum limit on the diameter of the lenses used, equal to that of the pupil. There is also a natural minimum limit on the diameter of the lenses used, equal to a length at which diffraction around the edges of each lens becomes an objectively large portion of the integral image presented by the lens. This natural limit is in the range of a diameter of one to two millimeters; it varies per user as well as per the specific optical design of the lens. Space between each bead in the array is present in a system. However, the space between each lens in the device is held to a negligible limit, such as the thickness of a human hair. Because the overall image seen through the lens array is at infinity, it is impossible to see such a hair's thickness while seeing at infinity. However, the true effective distance between integral images seen through each lens in the array is a combination of the hair's thickness between lenses and the diffraction limit mentioned above for any two adjoining lenses, thus the importance of maintaining an appropriate minimum diameter of all lenses in the array.

In an embodiment, only a small portion of the integral image shown by any given lens in the array needs to be shown at any given time. Each of the integral images shown by each of the lenses in the array present largely overlapping views of portions of the overall reference image. If the system is used with gaze tracking, the directionality of the user's view is known. The particular lenslet within the overall array that is then determined to be most directly in line with the viewer's gaze would then be used to display its entire integral image. The adjoining lenses in the array would then not need to show the entire integral images they might otherwise show, but would only need to show that part of each integral image which was not duplicated by data shown in the lens with the most direct path to the eye. The next adjoining lenses to those secondary lenses would also need to show only a small portion of the integral image they are capable of showing, and so forth across the overall array. The viewer would thus see the entire overall reference image, but as presented by a very small portion of the overall number of pixels in the display. When the eye's position moves, and its new position is detected by the gaze tracking system, the particular lenses used to present the central portion (and the largest share) of the overall reference image will be changed, and the relative portions of the full reference image presented by each lens in the array will change together with that. The areas of the display not needed, because they would present redundant information if used, could be left dark. More likely, however, give the general way that displays often work, they would simply be refreshed with new information much more slowly than would be that information at the central area of the user's gaze. The general term of art for this type of savings in information presented to the display is foveated rendering. The foveal display allows a tremendous enhancement in efficiency over normal foveated rendering because of the vast areas of redundant information across the surface of the display that the foveal display makes possible either to omit or to change less frequently.

In an embodiment, a volumetric 3D view of the full reference image may be shown on any flat panel, with or without utilizing gaze tracking. Volumetric information would be provided to the display, and the integral images shown by each lens in the array would be more or less fully utilized and projected by the lens in precise relationship to the data represented. What might be redundant information from one lens to another in the display, in other embodiments, would be used to present the slightly differing positional data from the differing perspectives of each lens, thus presenting a full autostereo volumetric image requiring no additional lens elements or specialized eyeglasses. The very same foveal display lens array would present either flat or 3D information, depending on the information provided. The pixel pitch of such a flat panel volumetric display would not need be as fine as an embodiment meant to be used as a near-eye display, and might range from 100 microns to 500 microns in order to produce a finely focused image to a user. For example, a user may be viewing a billboard which utilizes pixel pitch of 500 microns. A user will see a finely resolved image, even considering the areas between lenses in the lens array, because these relatively small areas will be invisible from a typical viewing distance required to see a billboard. By the same token, the proper combination of pixel pitch, lens size, lens focal length, and angle of view for each lens in the array may be determined to be able to create focus free viewing with no interruptions to the overall reference image for any flat panel display meant to be viewed at any distance from the eye.

In an embodiment, a user who requires corrective lenses for everyday use may use a foveal display lens array on top of any given display on a typical viewing device, such as a smartphone screen or a computer monitor, for the purpose of presenting the image produced by the underlying device in full focus without any need for corrective eyeglasses. As another example, a user's vehicle information display may be covered by a foveal display lens array that may assist a user in viewing vehicle information. This embodiment may provide a user with fully focused information at a focal distance of infinity: i.e. at the same focal plane as the view seen of the world through the windshield, thus sparing the user any need to take time for her or his eyes to accommodate to a different focal distance and allowing for safer driving.

In an embodiment, two foveal display lens arrays may be stationed back-to-back, with a prism structure in between in order to flip the image, to provide a user with the ability to see any image in full focus. A system that uses back-to-back lens arrays may provide a user with an alternative to requiring prescription lenses. Such a back-to-back lens array set up may provide most corrective lens users with a sharp viewing focus without the need of a prescription. The use of using back-to-back lenses to correct vision may also be a cheaper alternative than purchasing prescription lenses.

Figure 3:
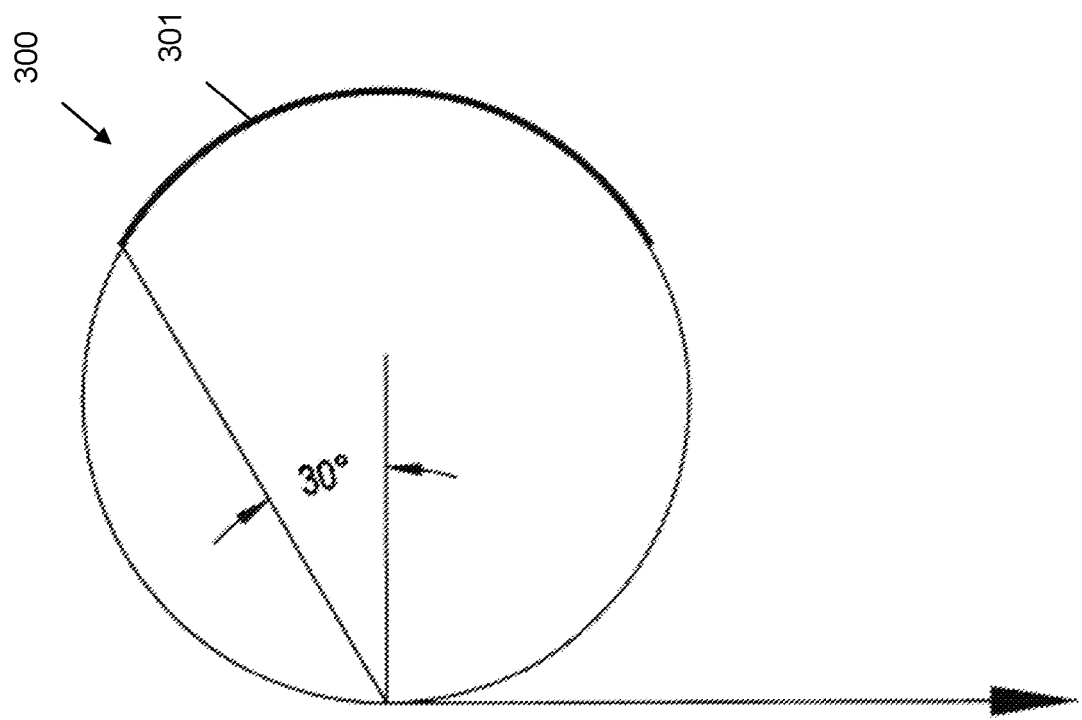
FIG. 3 is a structural diagram showing a detailed side view of the layers of a near-eye display in an embodiment.
Figure 4:
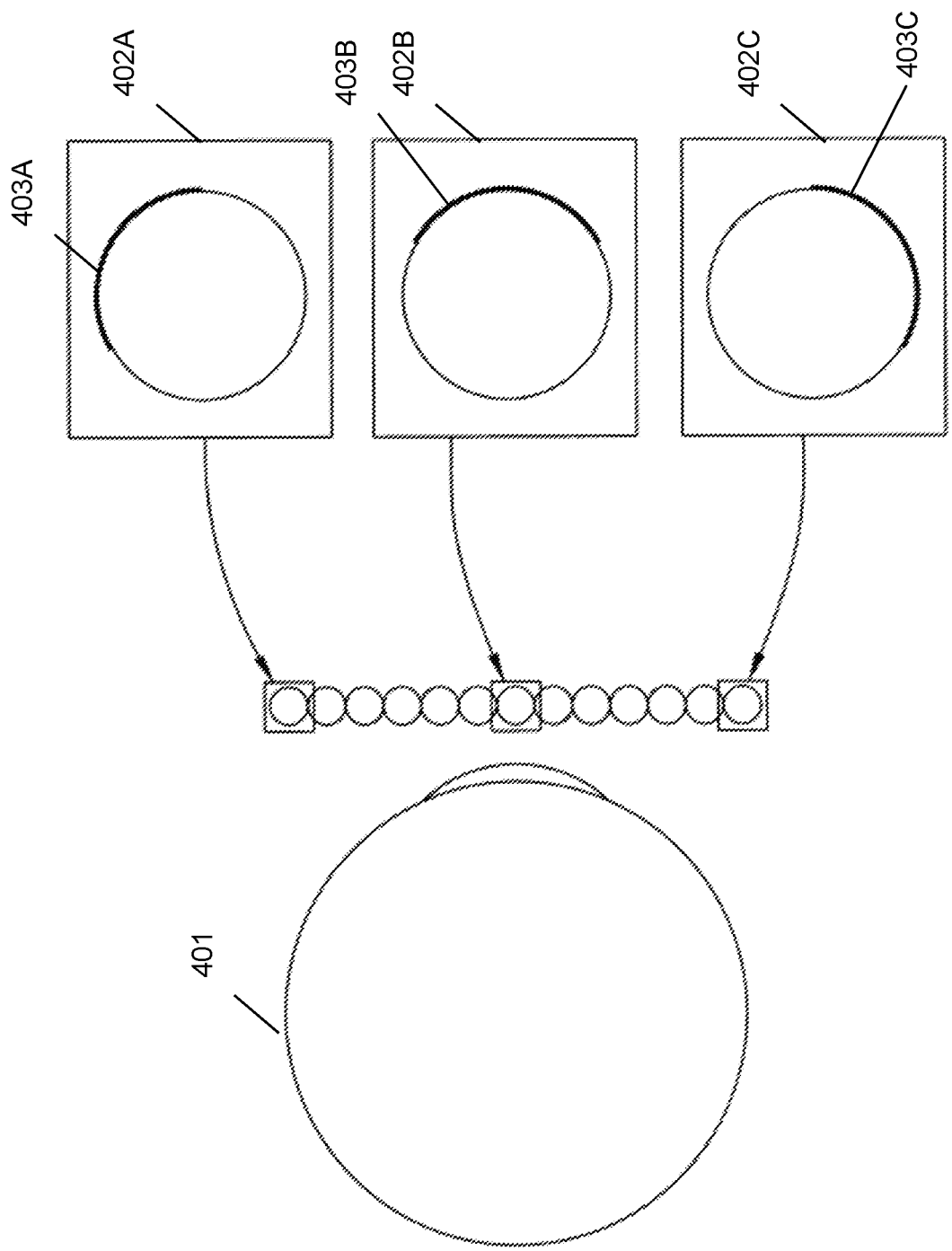
FIG. 4 is a structural diagram showing a detailed side view of the near-eye display in an embodiment.

Referring now to FIG. 3, an embodiment of one of the beads 300 of the device is shown in a side view. An embodiment shows the maximum area 301 behind each bead which needs to be spherical and covered by pixels in a display, for example, in this use case, the maximum area behind each bead can be identified using the equation $\sin \theta = 1/n = \frac{1}{2}$, which equates to $\theta = 30$ degrees. Different sizes of beads, numbers of beads, and the like, may change the area covered by each bead. FIG. 4 illustrates the maximum area behind different beads of the device. As the user's eye 401 focuses on a particular bead, 402A-402C as examples, each bead only needs to provide a maximum predetermined area 403A-403C for focusing. In other words, based upon the angle of the eye with respect to the bead, the eye could only focus on a particular area behind the bead, as opposed to the entire angle behind the bead.

An embodiment comprises light-emitting devices or a printed image of sufficiently high resolution behind the plurality of beads. There is at least one light-emitting device for each of the beads. The light-emitting device may cover the entire adjacent surface of a bead. Alternatively, the light-emitting device may only partially cover the adjacent side of a bead.

Brewster's angle, or the polarization angle, is the angle of incidence at which light is transmitted perfectly through a transparent surface with no reflection. Lenticular crosstalk occurs when a portion of the display may be visible at multiple locations. Reduction or complete elimination of lenticular crosstalk provides a display with higher resolution. Selection of a proper shape, and thus a proper light-directing bead, reduces this lenticular crosstalk because light from the light-emitting device bends in a pattern to the user's eye. United States Patent Publication No. 2015/0015946 describes this method for minimizing lenticular crosstalk, and is incorporated by reference in its entirety herein.

The pixel separation on the back of the device is set by the angular resolution required, and multiplied by the focal length. In an embodiment the device is a flat panel, rather than the sphere shape as discussed above. For example, in a flat panel with true retinal imaging for an adult (and not accounting for the eased requirements in perception made possible by the pinhole effect), the angular resolution would be 1 minute of arc=1/3600 radians. In this example, only the pixel located at that precise view needs to be in sharp focus or updated with the frame rate required by the application (a very fast rate for applications such as gaming or military use, and as slow as 24 frames per second for feature film viewing), and other pixels surrounding those pixels located in the central area of view will be seen by the eye in progressively softer focus (if at all), relative to their distance from the central area of view, and thus may be provided less information by the computing system that feeds the display. Thus, the system can be designed with a processor having less processing power than if all pixels need to be in sharp focus at all times.

Using the example discussed above, the light-directing beads may include small spheres or beads. In one example, the beads may at the maximum limit established by adult pupil size and have a diameter of 3.6 millimeters or 3600 microns. In such an example, the pixel separation for maximum apparent resolution (not including the pinhole effect) is 3600/3600 or 1 micron, in order to yield a system with resolution equal to 1 minute of arc. In various embodiments, the device size may be increased or the resolution decreased. A larger device may increase the total weight and power consumption of the device, but offers additional benefits such as a larger viewing area.

For some examples, see the following table:

TABLE 1

| Pixel Size | Focus Length | Resolution |
| --- | --- | --- |
| 8 microns | 3 mm | 14 minutes of arc |
| 8 microns | 10 mm | 4.3 minutes of arc |
| 8 microns | 30 mm | 1.4 minutes of arc |
| 4 microns | 10 mm | 2 minutes of arc |
| 4 microns | 20 mm | 1 minute of arc |

In an embodiment, the beads may be shaved, ground, molded, or the like, to a planar surface. The flat portion of the bead is positioned closest to the light-emitting device. The flat portion allows proper light transmittance from the light-emitting device to the bead.

In an embodiment, the spherical beads may be replaced by wide angle or fish-eye lenses (i.e. super-wide-angle lenses) with focal length equivalent to that required for the spheres. This would be one solution to allow the surface of the lens adjacent to the display to be flat. Also, with a wider angle of view the optics of the lenses may be designed, as understood by those in the art, such that the lenses focus directly on the flat back surface without requiring such a long focal length (and potential special materials to achieve that within a limited area by establishing a higher than normal index of refraction) as the spherical lenses require.

Figure 5:
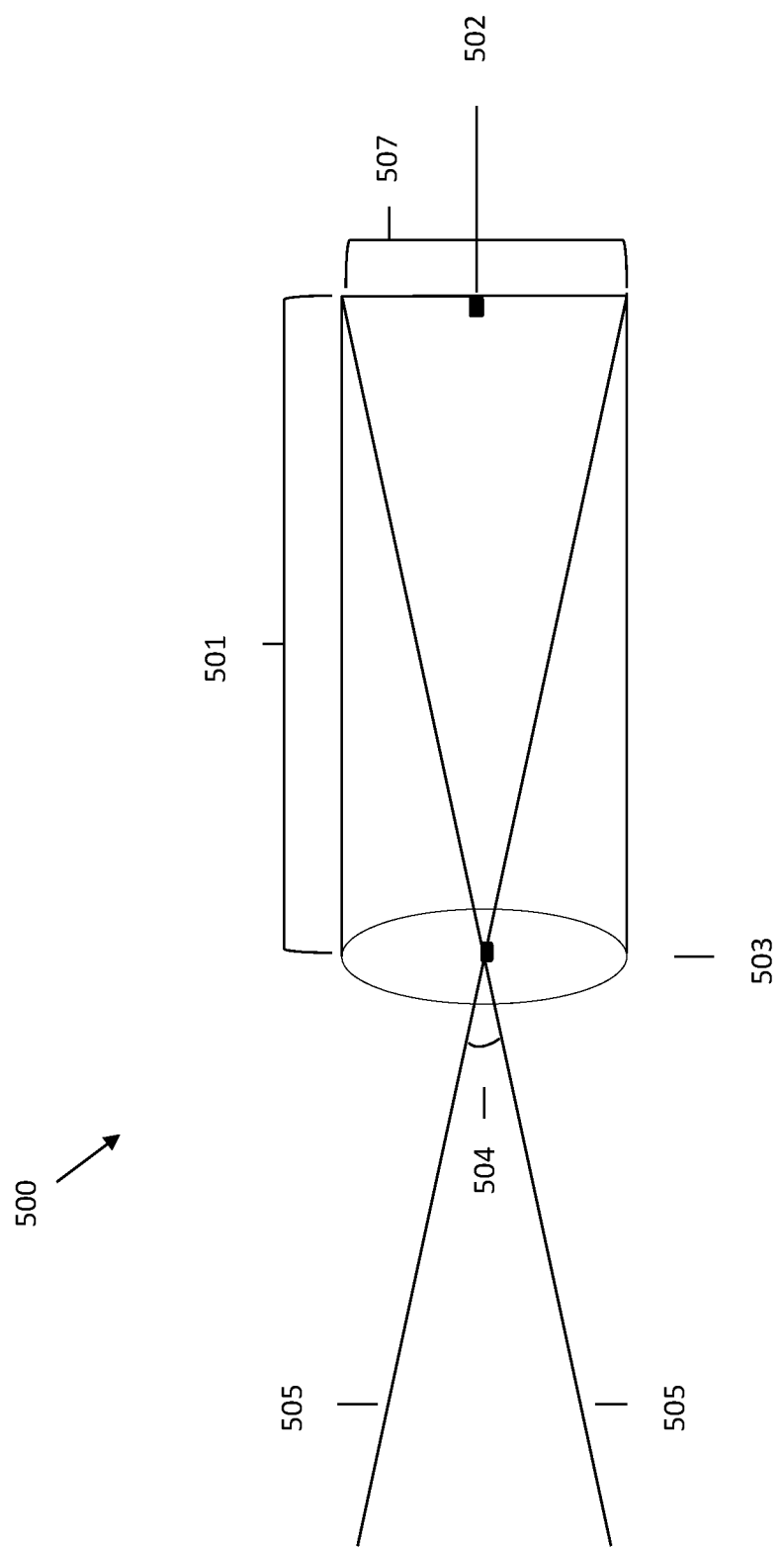
FIG. 5 is a structural diagram showing a detailed side view of a portion of the foveal array comprising a single lens in an embodiment.

Referring now to FIG. 5, in an embodiment, an image may be presented to each eye by use of a foveal display lens array, which utilizes multiple lenses to produce sectional views of an overall reference image for each eye. Orientation of the lenses may result in the lenses showing overlapping views since multiple lenses will each be covering a small area with an integral image 502 that differs only according to the slight difference in angle of view of the lens in relation to the eye. A precise angle of the viewers gaze 504 may be calculated to determine an instance where viewing a section of a reference image 502 will only occur through a single lens 503; thus, resulting in a clear view on the overall image and an overall improvement of the efficiency of the display. This angle may be calculated by:

$$A = 2\tan\left(\frac{S}{2L}\right)$$

where A is the full angle of the image of the lens 504, S is the diameter of the lens 507, and L is the focal length 501. This equation may produce an angular value in radians. The center of the image 502, located on the back side of the lenslet, must be the angle at which the lenslet 503 is pointed. The image at the top of the rear must be the image on the master image that is at an angle A/2 about that. The point at the center of the image of the next lens over, whether the next lens to the right or left, or up or down in the array, is determined by the angular distance of the center of that lens from the center of the original lenslet 503. In FIG. 5, 505 represents a user's gaze through a lens, as well as represents any other parallel rays of light going through the lenslet at the precise angle as a user is viewing an array. In an embodiment, gaze tracking may be integrated into the device. The gaze tracking determines the user's gaze position or where the user is focusing upon the device. The gaze tracking performs multiple functions. The gaze tracking allows processor resources to be conserved in areas of the device where the user is not focusing user gaze. The gaze tracking allows for greater resolution and processor resources to be used in areas where the user gaze is focused. Additionally, gaze tracking may determine the angle at which the eye sees the lens array. Assuming that there is delay between sensing the eye's position and viewing an image, some overlapping image information produced by the multiple lenses in an array may be shown in order to provide proper data to the eye. The amount of overlapping image information may be determined based on measuring latency periods between sensing eye position and producing image information. The gaze tracking system may also allow for greater visual resolution in areas of user gaze while simultaneously lowering power consumption and processor resources in device areas not in the user gaze. The gaze tracking input device is operatively coupled to a processor which may or may not be the same processor operatively coupled to one or more light-emitting device(s).

Minimal power consumption reduces the required power supply needed. This reduces the weight of the device. Reduction in power is important for a device that may be a portable electronic device such that the user may not need to carry extra batteries or may not need to keep the device connected to a charger or external power supply.

Minimal power consumption and the resulting reduction of power storage and supply also keep the weight of the device minimal. Since the device may be used in near-eye display devices, the apparatus is typically worn on the head. The reduced weight minimizes the bulk of the unit, reduces muscle strain, and allows the user greater range of motion when using the device. An embodiment of the device resembles swim goggles and provides an improvement over typical VR display hoods.

In an embodiment, there may be a user controlled knob, switch, or the like that allows a user to adjust the focus of the apparatus. The user may control the focus based on a user preference. In another embodiment, a processor may control the focus of the device.

In an embodiment, the light-directing beads (or fish-eye lenses) may be coated with an additional layer. These layers may include anti-scratch, anti-glare, water repellant, light reflective, and photosensitive or thermal-sensitive darkening coatings.

In the application, reference to "a processor" may control the focus of the foveal display device, control a single light-emitting device, control a plurality of light-emitting devices, control the interaction of the foveal display with other components of the device, or any combination of processing performed by the device in part or in whole.

A number of components of the device 1000 are stored in memory 1004. In particular, 3D display logic 1030 is all or part of one or more computer processes executing within CPU 1002 from memory 1004 in this illustrative embodiment but can also be implemented, in whole or in part, using digital logic circuitry. As used herein, "logic" refers to (i) logic implemented as computer instructions and/or data within one or more computer processes and/or (ii) logic implemented in electronic circuitry. Image 1040 is data representing one or more images and/or views which may be stored in memory 1004.

The above description is illustrative only and is not limiting. The present invention is defined solely by the claims which follow and their full range of equivalents.

It is intended that the following appended claims be interpreted as including all such alterations, modifications, permutations, and substitute equivalents as fall within the true spirit and scope of the present invention.

What is claimed is:

1. An apparatus, comprising:
a plurality of light-directing beads each focusing on an image plane at infinity, wherein the beads are arranged in a pattern having a first dimension and a second dimension, wherein the first dimension comprises a horizontal dimension and wherein the second dimension comprises a vertical dimension, wherein the plurality of light-directing beads direct a plurality of parallel rays of light to a human eye at a precise angle from each of the plurality of light directing beads producing a focus-free view of a display, wherein the focus-free view comprises a view of a scene on the display regardless of a visual acuity of a user and a distance of viewing without refocusing of the plurality of light-directing beads at different focal lengths and a focusing mechanism of the human eye; and
a display comprising a plurality of pixels, wherein the display is arranged behind the plurality of light-directing beads in relation to the human eye;
wherein each of the plurality of light-directing beads is associated with at least one of the plurality of pixels.

2. The apparatus of claim 1, wherein the beads are selected from the group consisting of: wide angle or fish-eye beads, elongated beads, spherical beads, and hexagonal beads.

3. The apparatus of claim 1, wherein the plurality of light-directing beads comprises a foveal display lens array; wherein each lens of the lens array provides for viewing of a portion of the display at a precise angle.

4. The apparatus of claim 3, wherein the precise angle produces a high resolution view of the portion of the display associated with a single lens.

5. The apparatus of claim 3, wherein the precise angle is determined based upon a diameter of a lens and a focal length of a lens.

6. The apparatus of claim 1, wherein the plurality of parallel rays of light present in the array produces a wide field of view.

7. The apparatus of claim 1, wherein each of the light directing beads comprises a natural maximum limit on the diameter of the bead and a natural minimum limit on the diameter of the bead, wherein the natural limitation on the diameter of a bead ranges from 1.5 mm to 4 mm;
wherein the natural limitation on the diameter of the bead varies based on the diameter of the pupil of a user and a design of a lens.

8. A near-eye display system, comprising:
at least one processor;
a power source operatively coupled to the processor;
a plurality of light-directing beads each focusing on an image plane at infinity, wherein the beads are arranged in a pattern having a first dimension and a second dimension, wherein the first dimension comprises a horizontal dimension and wherein the second dimension comprises a vertical dimension, wherein the plurality of light-directing beads direct a plurality of parallel rays of light to a human eye at a precise angle from each of the plurality of light directing beads producing a focus-free view of a display, wherein the focus-free view comprises a view of a scene on the display regardless of a visual acuity of a user and a distance of viewing without refocusing of the plurality of light-directing beads at different focal lengths and a focusing mechanism of the human eye; and
a display operatively coupled to the at least one processor and the power source and comprising a plurality of pixels, wherein the display is arranged behind the plurality of light-directing beads in relation to the human eye;
wherein each of the plurality of light-directing beads is associated with at least one of the plurality of pixels; and
wherein the plurality of light-directing beads direct light produced by the display to the human eye to generate a perceived image.

9. The system of claim 8, wherein the beads are selected from the group consisting of: wide angle or fish-eye beads, elongated beads, spherical beads, and hexagonal beads.

10. The system of claim 8, wherein the plurality of light-directing beads comprises a foveal display lens array; wherein each lens of the lens array provides for viewing of a portion of the display at a precise angle.

11. The system of claim 10, wherein the precise angle produces a high resolution view of the portion of the display associated with a single lens.

12. The system of claim 10, wherein the precise angle is determined based upon a diameter of a lens and a focal length of a lens.

13. The system of claim 8, wherein the plurality of parallel rays of light present in the array produces a wide field of view.

14. The system of claim 8, wherein the pattern having the first dimension and the second dimension is arranged to follow the curvature of a human eye.

15. The system of claim 8, wherein each of the plurality of light-directing beads is associated with more than one light emitting device.

* * * * *